(No Model.)
R. JONES.
Horse Power.
No. 240,253. Patented April 19, 1881.
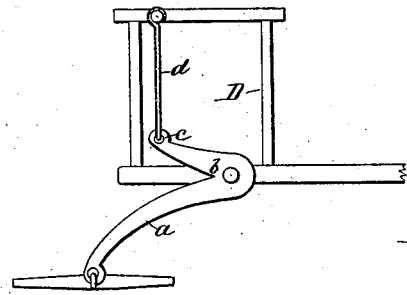
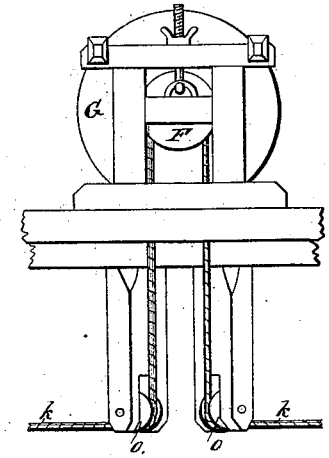
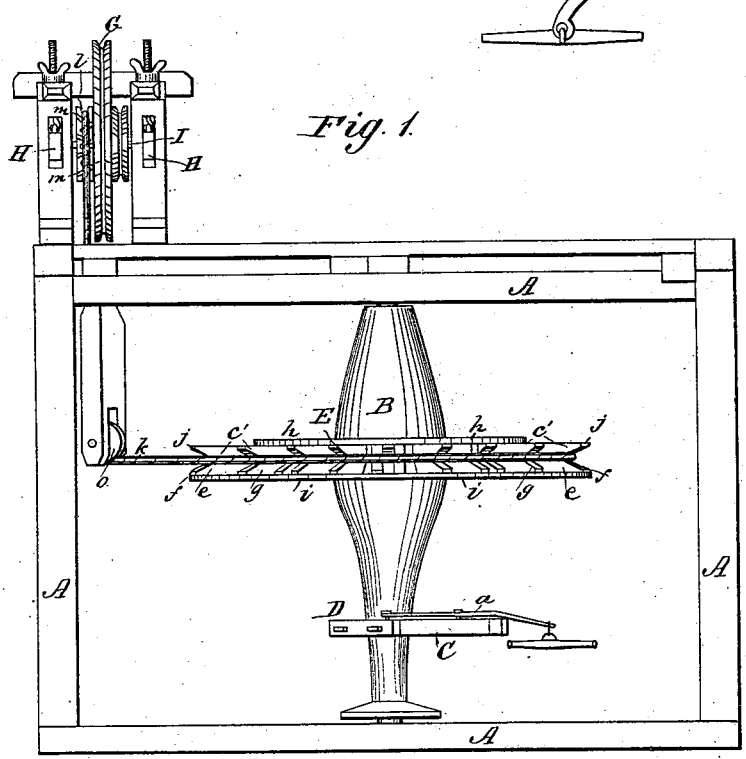
WITNESSES:
INVENTOR: Reuben Jones
ATTORNEYS.

UNITED STATES PATENT OFFICE.

REUBEN JONES, OF MOUNTVILLE, GEORGIA.

HORSE-POWER.

SPECIFICATION forming part of Letters Patent No. 240,253, dated April 19, 1881.

Application filed March 19, 1881. (No model.)

*To all whom it may concern:*

Be it known that I, REUBEN JONES, of Mountville, in the county of Troup and State of Georgia, have invented a new and useful Improvement in Horse-Powers; and I do hereby declare that the following is a full, clear, and exact description of the same, reference being had to the accompanying drawings, forming part of this specification, in which—

Figure 1 is a side elevation of my improved horse-power, and Figs. 2 and 3 are detail views.

My invention relates to improvements in horse-powers; and it consists, first, in the peculiar construction of the driving-wheel, carrying an endless rope, whereby the latter is prevented from slipping on the driving-wheel.

My invention further consists in certain details of construction hereinafter more fully set forth.

In the accompanying drawings, A represents the frame of my improved horse-power, in the top and bottom of which is journaled the vertical shaft B, adapted to be revolved by the horizontal arm C, secured to the shaft B near its lower end.

D is a rectangular frame, secured to the horizontal arm C near its outer end.

$a$ is a lever, pivoted to the horizontal arm C near the outer end of the latter, and projecting outwardly, to the front end of which a single-tree is secured for the attachment of a horse. The rear end of the lever $a$ is bent angularly and outwardly at $b$, and is provided with an eye, $c$, at its outer end, to which is secured a rod, $d$, the opposite end of which is attached to the rear cross-bar of the rectangular frame D, near its outer end. By this construction a yielding draft for the horse is secured, and the line of draft passes, in effect, through the outer end of the horizontal arm C, whereby the greatest leverage is obtained.

$c'$ represents one of a series of spokes having tenons on their inner ends, which are inserted in corresponding mortises in the vertical shaft B. The outer end of each of these spokes $c'$ is formed of a block, $e$, having two prongs, $f$, with inclined upper faces projecting radially from the end of said block, and a third prong, $j$, having an inclined inner face and projecting from the block above and between the lower prongs $f$.

$g$ are guide-arms for the endless rope $k$, notched at their outer ends to receive it, and secured at top to the rim $h$ and at bottom to the circular rim $i$, to which the spokes $c'$ are also secured.

It will be seen from the above description of the conformation of the outer end of the spokes that an endless rope passing through the notched guides and the prongs on the end of the spokes will pass in a zigzag direction between the prongs of the spokes, and will be prevented from slipping, so that an endless rope may be employed in the construction described, without danger of slipping, in lieu of an endless belt, which is more expensive than a rope. In this construction also, the prongs biting the endless rope, a much slacker belt may be employed than in the ordinary construction. The endless rope $k$, after having passed around the driving-wheel E, passes up and partly around the guide-pulleys $o$ and around the pulley F. The pulley F is constructed upon the same principle as the driving-wheel E, but in lieu of spokes is made solid, with a central groove, $l$, provided with inclined ribs $m$, extending from the outer circumference of the groove to its bottom, the ribs breaking joints with each other, so as to bite the endless rope in the groove and prevent it from slipping. The horizontal journal I of the pulley F is hung in vertically-adjustable bearings H.

G is an ordinary band-wheel on the shaft, from which motion may be communicated by a band to any machinery desired.

What I claim as new is—

1. The combination, with the vertical shaft B, of the horizontal arm C, rectangular frame D, lever $a$, provided with eye $c$ and rod $d$, substantially as described, and for the purpose set forth.

2. A spoke, $c'$, provided at its outer end with the prongs $f$, having inclined inner faces, and prong $j$, having an inclined inner face, and arranged above and between the prongs $f$, substantially as described, and for the purpose set forth.

3. The combination, with the vertical shaft

B, of the spokes c, mortised therein, and provided at their outer ends with the prongs f j, having inclined inner faces, and guide-arms g, notched at their outer ends, substantially as described, and for the purpose set forth.

4. The combination, with the vertical shaft B, having the horizontal arm C, of the driving-wheel E, having spokes c', with prongs f j, and notched guide-arms g, endless rope k, guide-pulleys o, pulley F, having inclined ribs m in its groove, breaking joints with each other, and band-wheel G, substantially as and for the purpose set forth.

REUBEN JONES.

Witnesses:
 SOLON C. KEMON,
 CHAS. A. PETTIT.